March 26, 1929.  F. S. SPRING  1,706,502
AUTOMOBILE DOOR WINDSHIELD
Filed March 31, 1926
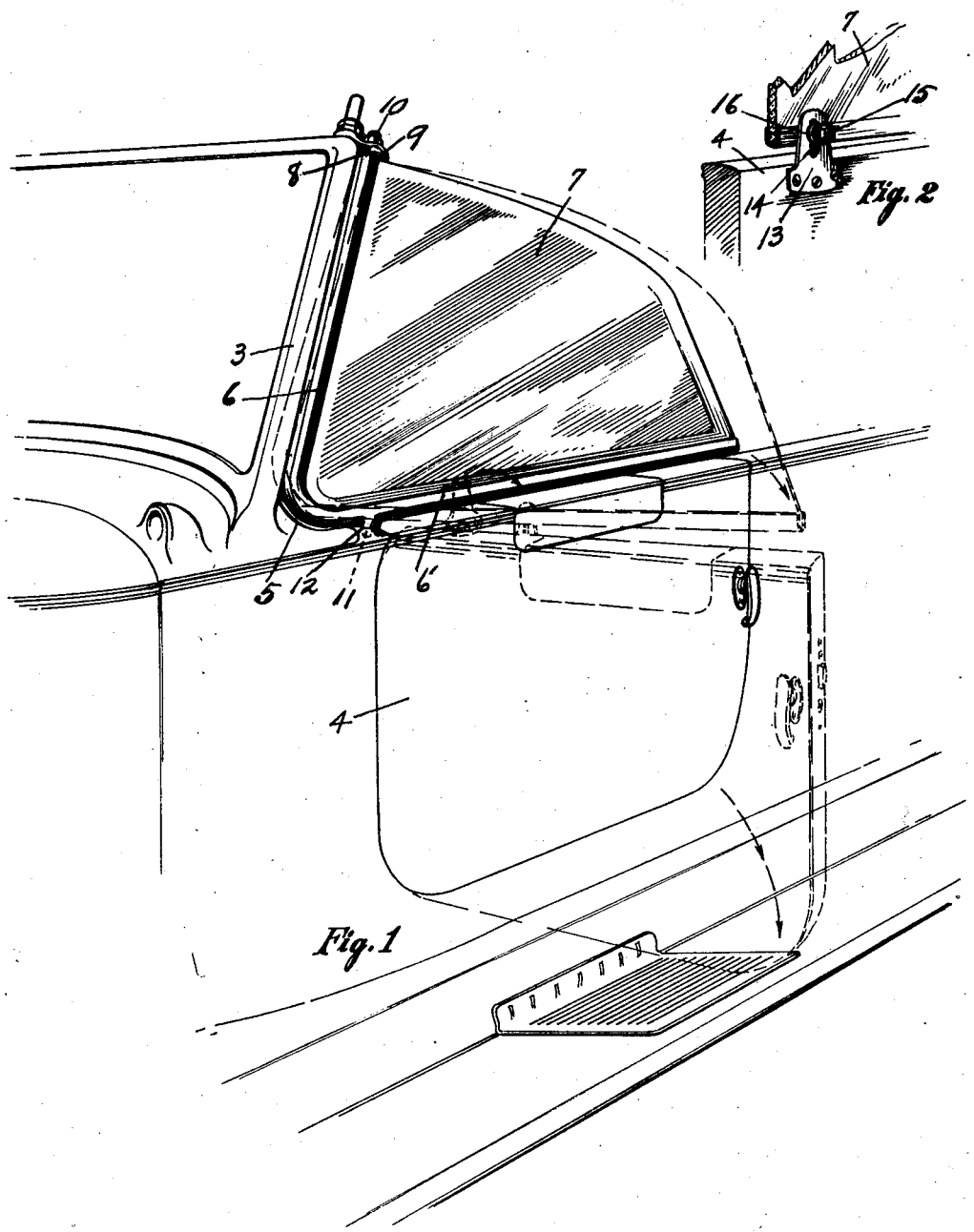
INVENTOR.
Frank S. Spring
BY
ATTORNEY.

Patented Mar. 26, 1929.

1,706,502

UNITED STATES PATENT OFFICE.

FRANK S. SPRING, OF PASADENA, CALIFORNIA, ASSIGNOR TO WALTER M. MURPHY CO., OF PASADENA, CALIFORNIA.

AUTOMOBILE DOOR WINDSHIELD.

Application filed March 31, 1926. Serial No. 98,860.

My invention relates more particularly to a windshield adapted to be hinged above the door of an automobile and to swing with said door as the door is opened and closed. It is an easy matter to provide a hinged windshield on straight hinges in connection with vertical or horizontal supports, but many automobiles now have a front windshield secured in an inclined position so that the angles of the windshield frame and the top of the door converge, making it necessary that any windshield which is to be placed between said windshield and the top edge of the door must have two frame members, or a single frame member having two parts, joined at an acute angle in order to fit snugly in the angle between the front windshield frame and the top of the car body and door.

My invention has for its main object to make possible a hinged windshield to operate in this acute angle between the front windshield frame and the top edge of the door and adapted to swing to open position with the door and thus give clearance for persons entering the car. To accomplish this I have provided a windshield frame hinged in such a way and attached to the door in such a way that the windshield will swing with the door and at the same time have a relative movement to the door as it turns upon its hinge connection.

In order to more fully explain my invention, I have illustrated one practical embodiment of my invention on the accompanying sheet of drawings, in which,—

Figure 1 is a fragmentary, perspective view of one side of an automobile, showing a front windshield, a door and my improved door windshield in place thereon; and Figure 2 is a fragmentary view of the inside of the door and door windshield and showing one method of attaching the windshield to the door to permit of relative movement.

Referring in detail to the drawings, the front windshield is designated 3, and is shown in a fixed inclined position, and the automobile door is designated 4, and is shown closed in full lines and in an open position in light broken lines. It will be seen that the angle between the front windshield 3, and the top edge of the door, 4, is an acute angle, slightly rounded, as at 5.

My improved door windshield, as here shown for descriptive purposes, comprises an angle member, 6, of channel form with a glass plate, 7, set therein, the angle of said member conforming to that of the front windshield and the top of the door, and being rounded to fit snugly into the rounded portion, designated 5, substantially as illustrated. The upper part of said angle member rests along the end of the front windshield frame, 3, as shown and is pivotally attached to the top thereof, as at 8, by means of a plate, 9, with nut, 10. At its lower side, the lower member is provided with a pivot boss, at 11, pivotally connected into a socket in the body, as at 12. It will be clear that as this angle member, 6, swings upon the two pivot connections, 8 and 11, the lower member thereof will not swing in a true horizontal plane, but will rise slightly while the rounded angle portion at 5, will swing inwardly and slightly downwardly. I provide a connection of said lower member to the door which will permit of this relative movement. This connection consists of a plate, 13, secured to the inside of the top edge of the door, 4, Fig. 2, said plate having a slot, 14, therein, with a bolt, 15, connecting the channel member, designated 6', through said slot so as to permit of a limited relative movement between said door and said channel member 6', as will be clear and as illustrated by the light broken lines in Fig. 1. Thus as the door is swung open, the windshield swings therewith and automatically adjusts itself relative to the door as said door is opened and again closed. A spring, as 16, may be used on the bolt, 15, as seen in Fig. 2.

While I have shown and described one practical means of thus connecting a door windshield to swing with the door, I am aware that changes in details and arrangement can be made without departing from the spirit of my invention, and I do not, therefore, limit my invention to the details used for illustrative purposes, except as I may be limited by the hereto appended claim.

I claim:

An automobile door windshield of the character referred to and including, in combination with a rearwardly inclined fixed windshield and the top edge of the body and a hinged door, an angle frame the angle of which is acute and conforms to the angle between said fixed windshield and the top of said body and door, one arm of said angle frame extending to the top of said fixed windshield and hingedly connected therewith, and the other arm of said angle frame extending rearwardly along the top edge of said body and door to the closing edge of said door, a hinge element connecting the lower arm of said angle frame to said body, glass in said angle frame, the two axes of said angle frame being not in alinement with each other, whereby as said door and said door windshield swing open, the lower edge of said door windshield and the top edge of said door separate, and operative connections between said door and door windshield to permit such relative movement as said door is opened and closed.

Signed at Pasadena, Los Angeles County, California, this 24th day of March, 1926.

FRANK S. SPRING.